UNITED STATES PATENT OFFICE.

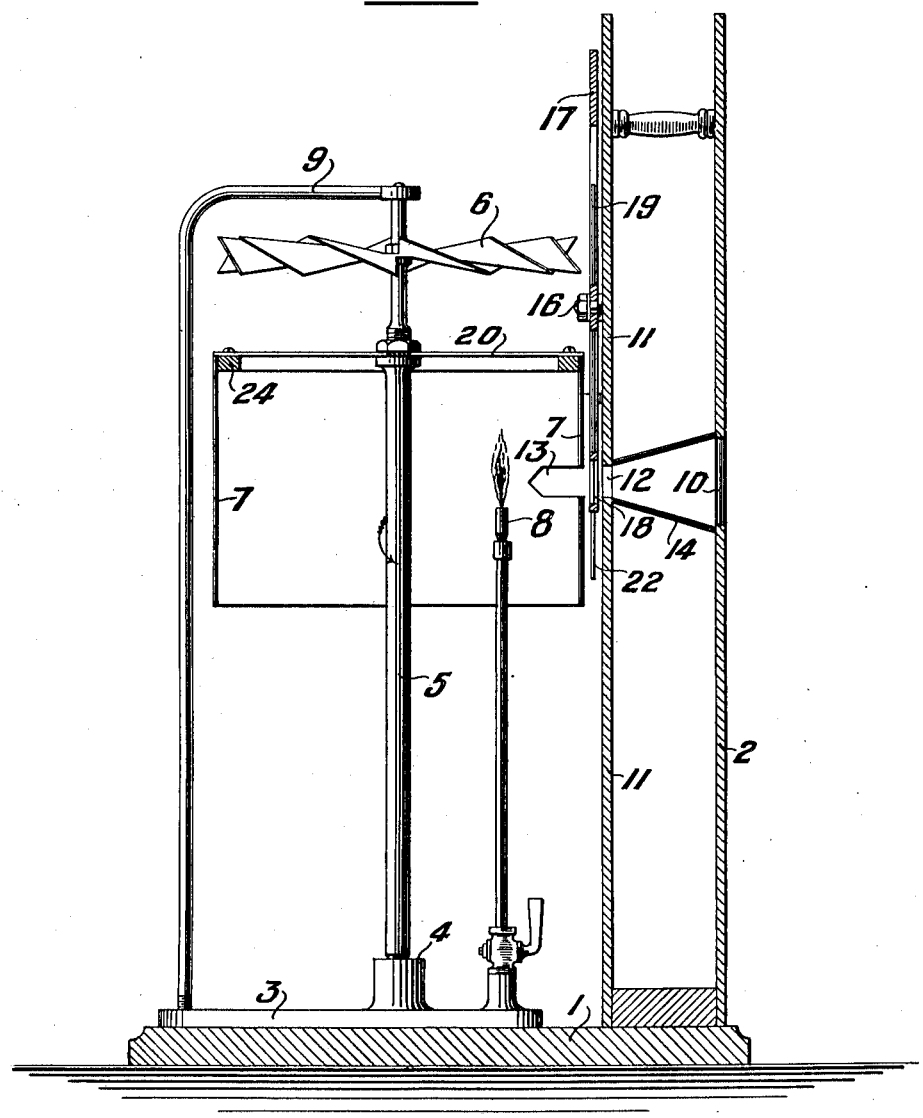

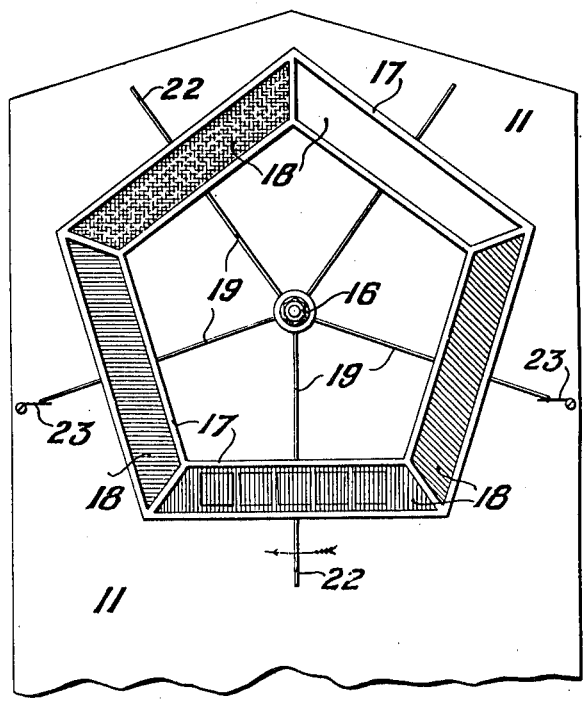
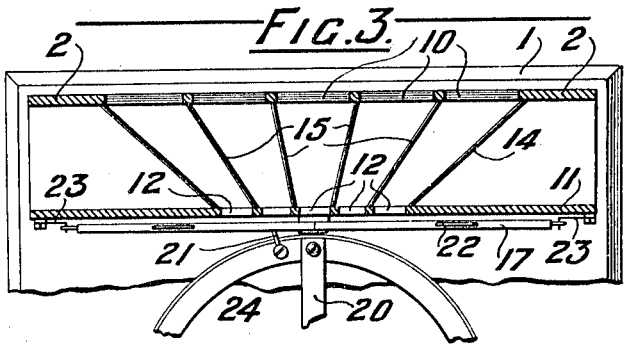

FREDERICK EVANS, OF LONDON, ENGLAND.

ADVERTISING DEVICE.

982,355.     Specification of Letters Patent.     Patented Jan. 24, 1911.

Application filed April 15, 1910. Serial No. 555,663.

*To all whom it may concern:*

Be it known that I, FREDERICK EVANS, a subject of the King of Great Britain, residing at Hatton Garden, in the city of London, England, have invented certain new and useful Improvements in Advertising Devices, and of which the following is a specification.

This invention relates to improvements in advertising devices of that kind in which a transparent or translucent picture is progressively and gradually illuminated by a central source of light, the space between the picture and the source of light being divided by cross partitions into cells, opening externally on to the picture and internally on to the periphery of a revolving cylinder surrounding the source of light, said cylinder having walls alternately transparent and opaque and revolved by clockwork or otherwise.

In carrying out my present invention I employ a rotating cylinder which is constructed of opaque material and contains within it the source of light, said cylinder being formed with slots or openings in its circular wall through which the rays of light pass through the smaller ends of tapered compartments in the larger ends of which the series of transparent letters or devices are fitted. These letters or devices are not intended to be progressively illuminated by a continuously advancing wave of light, but there is to be a distinct break between the illumination of one of the letters or devices and the illumination of the next, and so on, and to this end I separate the smaller opening of one tapered compartment from the opening of the next adjacent compartment by an opaque distance piece, so that a step-by-step illumination of the devices shall take place as the slot of the light-containing cylinder advances and travels around the open smaller ends of the tapered compartments. I also provide means whereby any desired number of colors can be employed to give colored effects to the advertisement displayed, without entailing any alteration of the drum or cylinder which is only provided with the slot or slots aforesaid through which the light rays are projected on to the back of the device to be illuminated. This means comprises a frame adapted to rotate between the slot or slots in the drum and the device to be illuminated, and provided with a number of colored screens. Intermittent movement is given to the frame by one of the rotating parts, so that each colored screen successively coincides with the slot or slots in the drum. Suitable devices are employed to retain the frame carrying the colored screens in position to allow the light issuing from the slot in the rotating drum to penetrate the colored screen and be transmitted through the tapered compartmented chamber, to give a colored effect to the advertisement.

I will describe my invention more fully with reference to the accompanying drawings, which show an example of construction of the improved advertising device.

Figure 1 is a vertical section thereof. Fig. 2 is a rear elevation of the polygonal frame provided with colored screens and means for retarding its rotation. Fig. 3 is a part sectional plan showing the means by which intermittent movement is given to the colored screens and also the compartmented chamber through which the rays of light are projected to illuminate the letters or devices.

On a platform 1 is carried an advertisement display plate 2 and a base-plate 3. The base-plate 3 is provided with a footstep bearing 4 to support the spindle 5 on which is fixed a fan 6 for causing the spindle 5, together with the slotted drum 7 carried thereby, to rotate by hot air ascending from the burner 8. The burner shown is an ordinary gas burner, but it may be an incandescent gas burner or even an electric arc lamp, the hot ascending air from which would effect the same purpose. The upper end of the spindle 5 is suitably supported by a bracket 9, consisting of a vertical rod secured to the base-plate 1 and bent over at its upper end to provide the desired support. The plate 2 may be formed of opaque material except at the portion or portions 10 where a transparent advertisement—which may consist of letters or devices—is provided. At the rear and at a suitable distance from this plate 2 the platform 1 supports in vertical position, a second opaque plate 11 having slots 12 therein, which are preferably of smaller area than the portions 10 which it is desired to illuminate. The slots 12 are so situated in the vertical plate 11 as to be occasionally opposite the slot 13 in the drum 7, as the latter turns and moreover there is left between each pair of the openings 12 (Fig. 3) a bar of the opaque plate 11, which bar may be of any desired width in order that there shall be a step-by-step illumination of the devices at the portions 10 in contradistinction to illuminating the latter in a progressive and continuous manner.

Projecting from outside the openings 12 toward the portions 10 of the plate 2 is a tapered rectangular light transmitting chamber 14 splayed in a forward direction as shown, and if desired, provided with a number of vertically arranged division walls 15 (see Fig. 3), so as to constitute a compartmented chamber, each compartment registering with the letter or device to be illuminated.

Supported on a horizontal pin or stud 16 on the rear side of the plate 11 is a light metal frame 17 carrying a plurality of colored screens 18. In the present case five such screens are shown, see Fig. 2, but a greater or less number could be used. These colored screens are connected to the hub on which they rotate by arms or spokes 19. The frame 17 has imparted to it intermittent rotary motion, and the colored screens 18 thereon are adapted to come successively into alinement with the slot 13 in the drum and the slots 12 in the plate 11 between which the frame rotates. It will therefore readily be seen that upon the slot in the drum 7 coming opposite one of the colored screens 18 and the slots 12, the rays of light projected from the illuminating source inside the drum 7, will penetrate the colored screen, and passing through the slots 12 illuminate the letters or devices situated opposite the larger and front end of the compartmented chamber 14. An advantageous mode of supporting the drum consists in fixing it to a metal ring 24 secured to the spindle 5 by means of thin metal arms 20. Partial rotation may be imparted to the frame 17, say at each rotation of the drum, by a finger or tappet 21 on the drum-supporting ring 24 (see Fig. 3) or by a tappet carried on or about the rotating spindle 5 and so positioned as to engage one of the spokes of the said frame. Extensions of the spokes 19 or pins or projections 22 on the frame 17 are adapted to be engaged by weak metal springs 23 or the like, in order to retain the said frame in any one of the desired positions until upon another rotation of the drum 7 the frame is again moved.

With the arrangement of the compartmented chamber 14 as described, the inner walls of which are whitened or provided with light reflecting surfaces, it is possible to illuminate a large surface with a comparatively small source of illumination, and it is therefore possible to employ a comparatively small drum.

Although I have described the drum 7 as being driven by the hot air ascending from the burner, it may be driven by other suitable means, in which case of course the fan 6 could be dispensed with.

What I claim as my invention and desire to secure by Letters Patent is:—

1. In an advertisement device, the combination of a vertical revoluble spindle, means for supporting the said spindle, a drum carried by said spindle and having a segmental slot through its circular wall, means for revolving said spindle and drum, a source of light located within the said drum to project its light rays through said slot, a carrier frame a plurality of color screens carried by said frame, means for rotatably supporting said carrier frame, means for partially rotating said carrier frame, and for limiting the extent of angular motion of said carrier frame at the termination of each of such movements, and means for supporting an advertisement in front of the color screens carried by said carrier frame and opposite said slot in said drum, so that rays of light passing through said slot and said color screens fall on the said advertisement substantially as set forth.

2. In an advertisement device, the combination with a vertical revoluble spindle, means for supporting the said spindle, a drum carried by said spindle and having a segmental slot through its circular wall, means for rotating said spindle and drum, and a source of light located within the said drum to project its light rays through said slot; of a carrier frame a plurality of color screens carried by said frame, a horizontal spindle for rotatably carrying said frame, a vertical slotted plate carrying said horizontal spindle, means for partially rotating said carrier frame at each revolution of said drum, and for limiting the extent of angular motion of said carrier frame at the termination of each of such movements, and means for supporting an advertisement in front of the color screens carried by said carrier frame and opposite said slot in said drum, so that rays of light passing through said slot and said color screens fall on the said advertisement substantially as set forth.

3. In an advertisement device, the combination with a vertical revoluble spindle, means for supporting the said spindle, a drum carried by said spindle and having a segmental slot through its circular wall, means for rotating said spindle and drum, and a source of light located within the said drum to project its light rays through said slot; of a carrier frame a plurality of color screens carried by said frame, a horizontal spindle for rotatably carrying said frame, a vertical slotted plate carrying said horizontal spindle, a tappet on said drum to contact with and partially rotate said carrier frame at each revolution of the drum, means for limiting the extent of angular motion of said carrier frame at the termination of each of such movements, and means for supporting an advertisement in front of the color screens carried by said carrier frame and opposite said slot in said drum, so that rays of light passing through said slot and said color screens fall on the said advertisement substantially as set forth.

4. In an advertisement device, the combination with a vertical revoluble spindle, means for supporting the said spindle, a drum carried by said spindle and having a segmental slot through its circular wall, means for rotating said spindle and drum, and a source of light located within the said drum to project its light rays through said slot; of a carrier frame a plurality of color screens carried by said frame, a horizontal spindle for rotatably carrying said frame, a vertical slotted plate carrying said horizontal spindle, a tappet on said drum to contact with and partially rotate said carrier frame at each revolution of the drum, arms projecting radially from the carrier frame, springs located on the vertical slotted plate to contact with said arms and limit the angular motion of the said carrier frame at each revolution of the drum, and means for supporting an advertisement in front of the color screens carried by said carrier frame and opposite said slot in said drum, so that rays of light passing through said slot and said color screens fall on the said advertisement substantially as set forth.

5. In an advertisement device, the combination with a vertical revoluble spindle, means for supporting the said spindle, a drum carried by said spindle and having a segmental slot through its circular wall, means for rotating said spindle and drum, a source of light located within the said drum to project its light rays through said slot, a carrier frame a plurality of color screens carried by said frame, a horizontal spindle for rotatably carrying said frame, a vertical slotted plate carrying said horizontal spindle, means for partially rotating said carrier frame at each revolution of said drum, and means for limiting the extent of angular motion of said carrier frame at the termination of each of such movements; of walls forming a tapered compartmented chamber supported at their rear ends by the aforesaid slotted plate, an opaque plate having transparent portions, means on the opaque plate for supporting the forward ends of the compartmented chamber walls in such a position that said compartmented chamber is in register with slots in the aforesaid slotted plate, and with an advertisement on the transparent portions of the opaque plate, the said compartmented chamber being located opposite the said slot in said drum, so that rays of light passing through said slot, said color screens and said compartmented chamber fall on the said advertisement substantially as set forth.

6. In an advertisement device, the combination with a vertical revoluble spindle, a platform, a base-plate on said platform, a foot-step bearing on said base-plate to support the said spindle, a drum carried by said spindle and having a segmental slot through its circular wall, means for rotating said spindle and drum, a source of light located within said drum to project its light rays through said slot, a carrier frame a plurality of color screens carried by said frame, a horizontal spindle for rotatably carrying said frame, a vertical slotted plate supported by said platform and carrying said horizontal spindle, a tappet on said drum to contact with said carrier frame at each revolution of the drum, arms projecting radially from the carrier frame, springs located on the vertical slotted plate to contact with said arms and limit the angular motion of said carrier frame at each revolution of the drum; of walls forming a tapered compartmented chamber supported at their rear ends by the aforesaid slotted plate, an opaque plate carried by the aforesaid platform and having transparent portions, and supporting the forward ends of the compartmented chamber walls in such a position that said compartmented chamber is in register with slots in the aforesaid slotted plate, and with an advertisement on the transparent portions of the opaque plate, the said compartmented chamber being located opposite the said slot in said drum, so that rays of light passing through said slot, said color screens and said compartmented chamber fall on the said advertisement substantially as set forth.

In witness whereof I have hereunto set my hand in the presence of two witnesses.

FREDERICK EVANS.

Witnesses:
 THOMAS WILLIAM ROGERS,
 WILLIAM ANDREW MARSHALL.